United States Patent
Patel et al.

(10) Patent No.: US 10,417,798 B2
(45) Date of Patent: Sep. 17, 2019

(54) SYSTEM AND METHOD BASED ON SLIDING-SCALE CLUSTER GROUPS FOR PRECISE LOOK-ALIKE MODELING

(71) Applicant: Cadreon LLC, San Francisco, CA (US)

(72) Inventors: Bhupendra Mohanlal Patel, Fremont, CA (US); Nilesh Kuchekar, San Francisco, CA (US); Tushar Patel, San Francisco, CA (US)

(73) Assignee: Cadreon LLC, San Francisco, CA (US)

( * ) Notice: Subject to any disclaimer, the term of this patent is extended or adjusted under 35 U.S.C. 154(b) by 0 days.

(21) Appl. No.: 15/817,215

(22) Filed: Nov. 19, 2017

(65) Prior Publication Data

US 2019/0156529 A1    May 23, 2019

(51) Int. Cl.
| | | |
|---|---|---|
| *G06T 11/20* | (2006.01) | |
| *G06F 3/0484* | (2013.01) | |
| *G06F 7/02* | (2006.01) | |
| *G06F 7/08* | (2006.01) | |
| *G06F 7/20* | (2006.01) | |
| *G06T 11/00* | (2006.01) | |

(52) U.S. Cl.
CPC ........ *G06T 11/206* (2013.01); *G06F 3/04845* (2013.01); *G06F 3/04847* (2013.01); *G06F 7/026* (2013.01); *G06F 7/08* (2013.01); *G06F 7/20* (2013.01); *G06T 11/001* (2013.01); *G06T 2200/24* (2013.01)

(58) Field of Classification Search
CPC .. G06F 3/04845; G06F 3/04847; G06F 7/026; G06F 7/08; G06F 7/20; G06T 11/001; G06T 11/206; G06T 2200/24
See application file for complete search history.

(56) References Cited

U.S. PATENT DOCUMENTS

| | | | |
|---|---|---|---|
| 6,990,238 B1* | 1/2006 | Saffer | G06F 17/30716 382/224 |
| 2011/0320319 A1* | 12/2011 | Streich | G06Q 30/06 705/27.1 |
| 2014/0201126 A1* | 7/2014 | Zadeh | G06K 9/627 706/52 |
| 2018/0225588 A1* | 8/2018 | Khidekel | G06N 5/04 |

OTHER PUBLICATIONS

Murphy, D. M., A. M. Middlebrook, and M. Warshawsky. "Cluster analysis of data from the Particle Analysis by Laser Mass Spectrometry (PALMS) instrument."  Aerosol Science & Technology 37.4 (2003): 382-391 (Year: 2003).*

* cited by examiner

*Primary Examiner* — Diane M Wills
(74) *Attorney, Agent, or Firm* — Loeb & Loeb LLP

(57) ABSTRACT

A graphical user interface showing relevant sliding scale cluster groups having a processor generating a ranking of Top N1 features of the seed dataset in order of frequency of their occurrence. The processor generates another ranking of Top N2 features of the seed dataset in order of frequency of their occurrence in correlation with their equivalent percentage in total dataset. The Top M co-related features is identified for each of the Top N (N1+N2) features that are present for the seed dataset. The processor, for each one in M×N set, generates a sliding scale cluster via permutation of Top M features. The processor sorts each permutation based on closest occurrence match. The Seed Group Meta Bitmap Index is generated for the seed audience segment. For each cluster, the processor calculates the available amplification count from the Total Audience Bitmap Index, until the desired amplification is achieved.

20 Claims, 10 Drawing Sheets

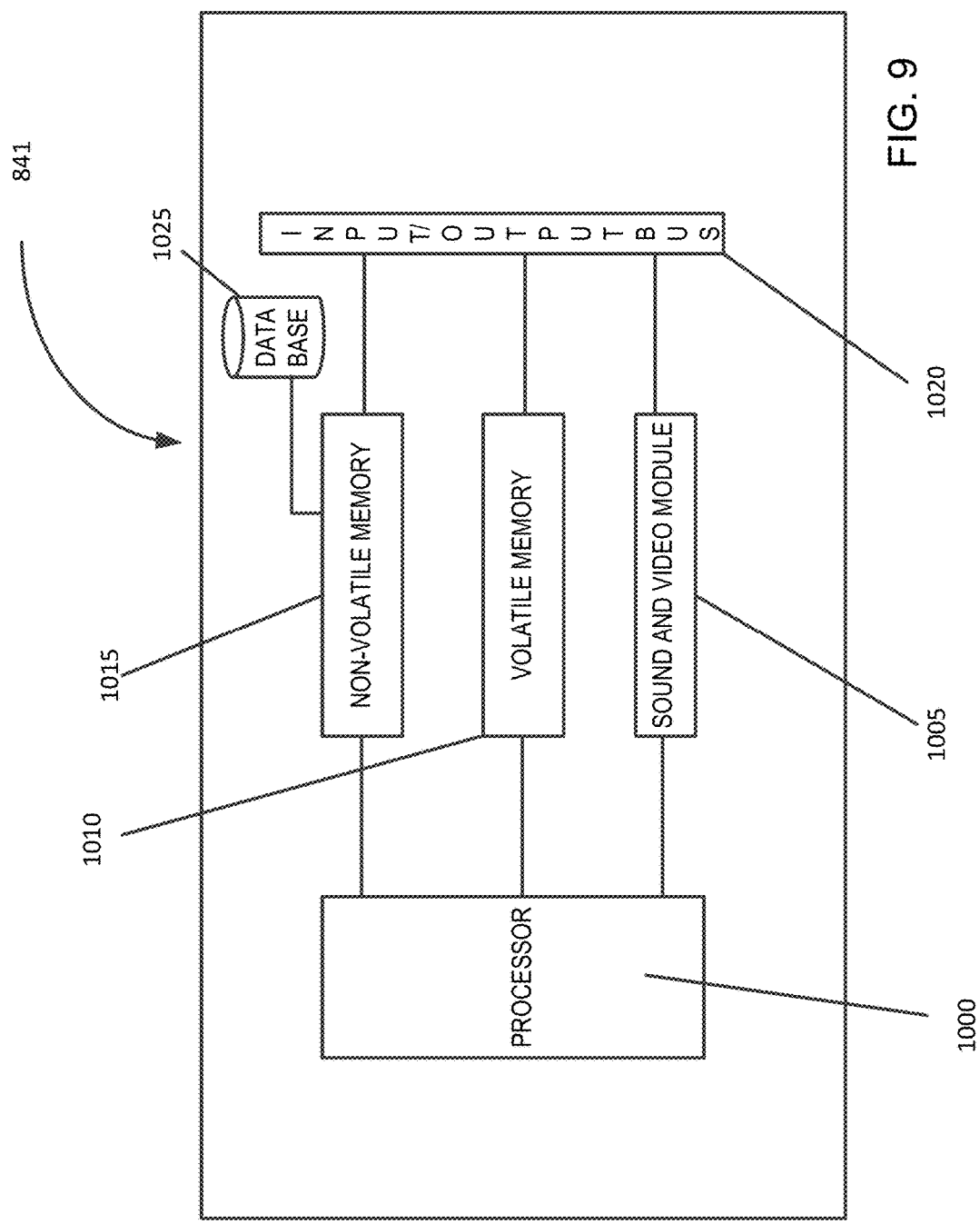

SYSTEM AND METHOD BASED ON SLIDING-SCALE CLUSTER GROUPS FOR PRECISE LOOK-ALIKE MODELING

BACKGROUND

Identifying the right target group has always been a challenge for a variety of real-world applications. For example, marketers or merchants constantly strive for finding the best way to reach their best customers from a big pool of "potential customers." Similarly, social study scientists, pollsters, and other industries also wish to find the most likely target audience for them to perform next level of predictions or further studies. These users apply statistical analysis on the data and numbers they collected, and the key differentiator to identify the most relevant and accurate set has always been the data and the right modeling that applies to the data.

At a very basic-level, a look-alike modeling enables marketers, for example, to reach new prospects that "look-alike" their best customers, not just any customers. In this example, the process involves finding target audiences from the total audience pool that "look-alike" your seed audience, so you can target more audiences that fit the profile of your seed audience. Current practices require redefining of the desirable "look-alike" parameters, features or attributes before the computer system "re-runs" the data to output the desirable size or outcome. Moreover, many of the cluster parameters or features are predefined, which prohibit flexibility in a user-defined desirable "look-alike" amplification.

SUMMARY

Aspects of the invention improve over prior approaches by providing a different, faster, and more accurate approach to the look-alike modeling. In particular, embodiments of the invention provide a dynamic graphical user interface (GUI) enabling a user to dynamically adjust the accuracy of the look-alike cluster. This greatly reduces the need for a marketer to wait for results from the analysis and provides tremendous flexibility in performing ad-hoc simulations or adjustments of variables or parameters in the target population.

BRIEF DESCRIPTION OF DRAWINGS

The invention may be better understood by references to the detailed description when considered in connection with the accompanying drawings. The components in the figures may not necessarily be to scale, emphasis instead being placed upon illustrating the principles of the invention. In the figures, like reference numerals designate corresponding parts throughout the different views.

FIG. 9 is an illustration of a server computing device suitable for aspects of the invention.

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

DETAILED DESCRIPTION

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Aspects of the invention enable a user with the ability to create sliding scale cluster groups of embedded clusters overlapping with each other for a specified seed audience segment. Subsequently, the user may be able to identify the intersections per cluster across different groups in reasonably dynamically via a graphical user interface (GUI) without the need to wait for developers or programs to regenerate the necessary query strings. Calculating the intersections per cluster enables for optimally amplifying each cluster from seed audience in order of relevancy against the total population proportionally. Embodiments of the invention promote efficiency in identify these intersections per cluster, especially when a given population size of a cluster may be over 100s millions or billions of data.

Figure 1:
FIG. 1 illustrates a diagram of a seed audience segment according to one embodiment of the invention.

To begin the illustration of the effectiveness of embodiments of the invention, FIG. 1 is a diagram illustrating a simple GUI 100 showing a segment of audience that needs further refined and explored. In one embodiment, each dot may represent a person or a unit of the audience. For example, a dot 102 in the GUI 100 illustrates a graphical representation of a unit of the cluster group or a dataset, and the cluster group is represented graphically on the GUI. For example, the cluster group may be shown as a plurality of dots or other symbols shown in the GUI 100. For example, a marketer may wish to start a new advertising campaign for a new flavor of a beverage. The GUI 100 may represent the a pool of population of 200 million individuals who may become potential purchasers of the new flavor of the beverage. The dot 102 may represent a unit of this pool, which may be 200 individuals. It is to be understood that the unit and the size of the unit may be varied based on the size of the population and the size of the GUI 100 without departing from the scope and spirit of aspects of the invention.

Of course, with a population or a cluster size of millions or more, it would be challenging to identify relevant information without further magnification or zooming into the details. In addition, the analysis, magnification or zooming and the changes thereof are needed to take place relatively quickly, dynamically, or substantially instantaneously to accommodate the interests needed by the users.

Figure 2:
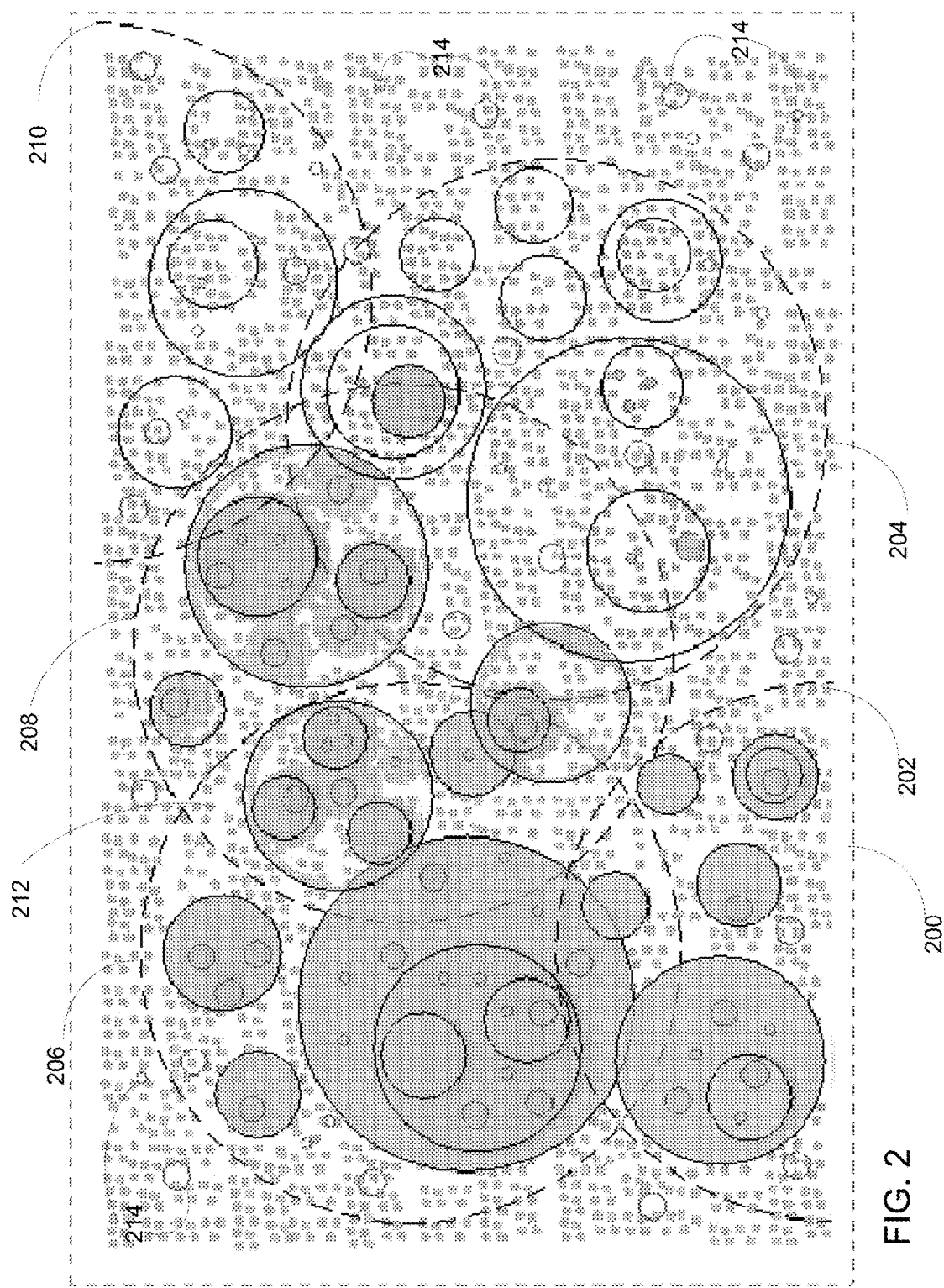
FIG. 2 illustrates a diagram of cluster groups created according to one embodiment of the invention.

In order to achieve such flexibility, FIG. 2 is a diagram showing clusters of groups according to one embodiment of the invention. In one example, a graphical user interface (GUI) 200 may be displayed on a display showing a number of clusters or possible seed datasets based on a population similar to that of the population shown in FIG. 1. In this GUI, the GUI 202 shows a number of cluster groups, clusters or a subset of the population. For example, a cluster 202 illustrates a group covered by the half circle or arc illustrated in the lower left hand corner of the GUI 200. Another cluster 204 illustrates yet another group, as well as clusters 206, 208 and 210. Each cluster may represent a subset of the population of interests. Within each cluster, in one example, there are further subsets or divisions in each cluster. In addition, in one embodiment, the clusters may intersect (as shown in FIG. 2 at 212). Additional intersections may be possible as well depending on the kind of population size and criteria that the user wishes to identify.

As an illustration, suppose the user wishes, using the example associated with FIG. 1, to run an advertisement campaign for a new flavor of a beverage. Within the overall population, there may be cluster groups or clusters. Each cluster group or cluster may include one or more parameters or attributes that define it. Cluster groups or clusters may or may not intersect. For example, the male and female are possible parameters or attributes for defining a cluster group for genders and these cluster groups or clusters do not intersect. In another example, different age groups may intersect if the parameters or attributes of the age cluster groups or clusters (such as age ranges) between different cluster groups or clusters may be defined differently. In another example, if some clusters are racial groups, the intersections may be those of an inter-racial families where racial or ethnicity information is a parameter or an attribute. Other ones such as a cluster for "those live in a metropolitan city" may intersect with a cluster for "those who do not own a vehicle." In other words, the user may identify or classify different cluster groups, each with various attributes and parameters, and embodiments of the invention may dynamically provide visual GUI to show the user of their identified population.

Figure 3:
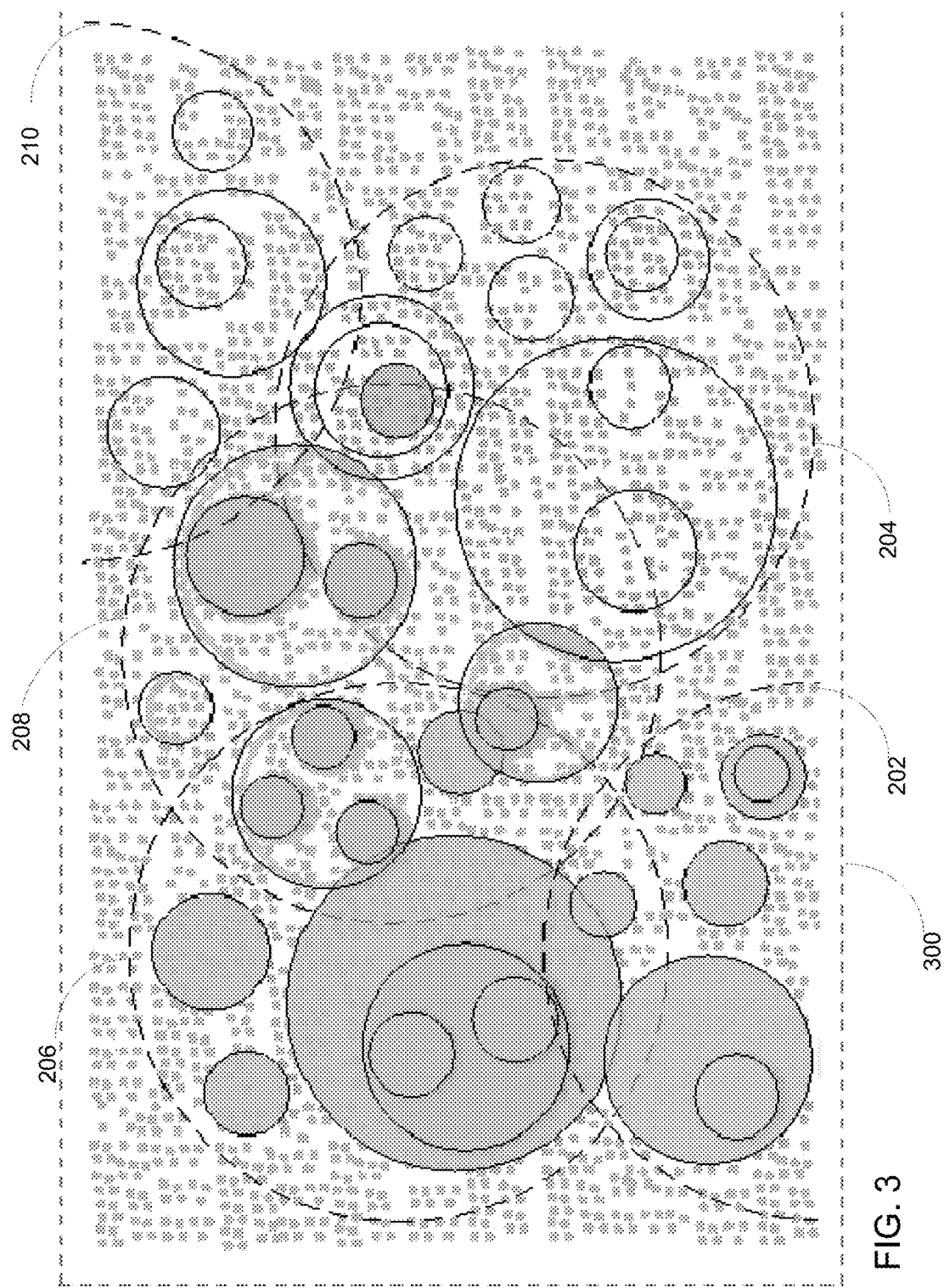
FIG. 3 illustrates another diagram of cluster groups without clusters that do not add value to the identification according to one embodiment of the invention.

Still referring to FIG. 2, the GUI 200 may also display clusters such as those in 214. These may be shown as a result of additional criteria requested or identified by the user based on questionnaire or other data. Referring now in FIG. 3, a GUI 300 shows a diagram for relevant sliding scale cluster groups. In this embodiment, the GUI 300 shows the cluster groups 202, 204, 206, 208, and 210 except for those similar to the clusters 214. Those clusters are deemed irrelevant as they do not provide any value add but add to the computation timings. As can be appreciated, the GUI 300's display of these non-relevant is helpful to the user in real-time or substantially real-time so that the user would not need to run calculation or modeling against a set of non-relevant cluster or data.

Figure 4:
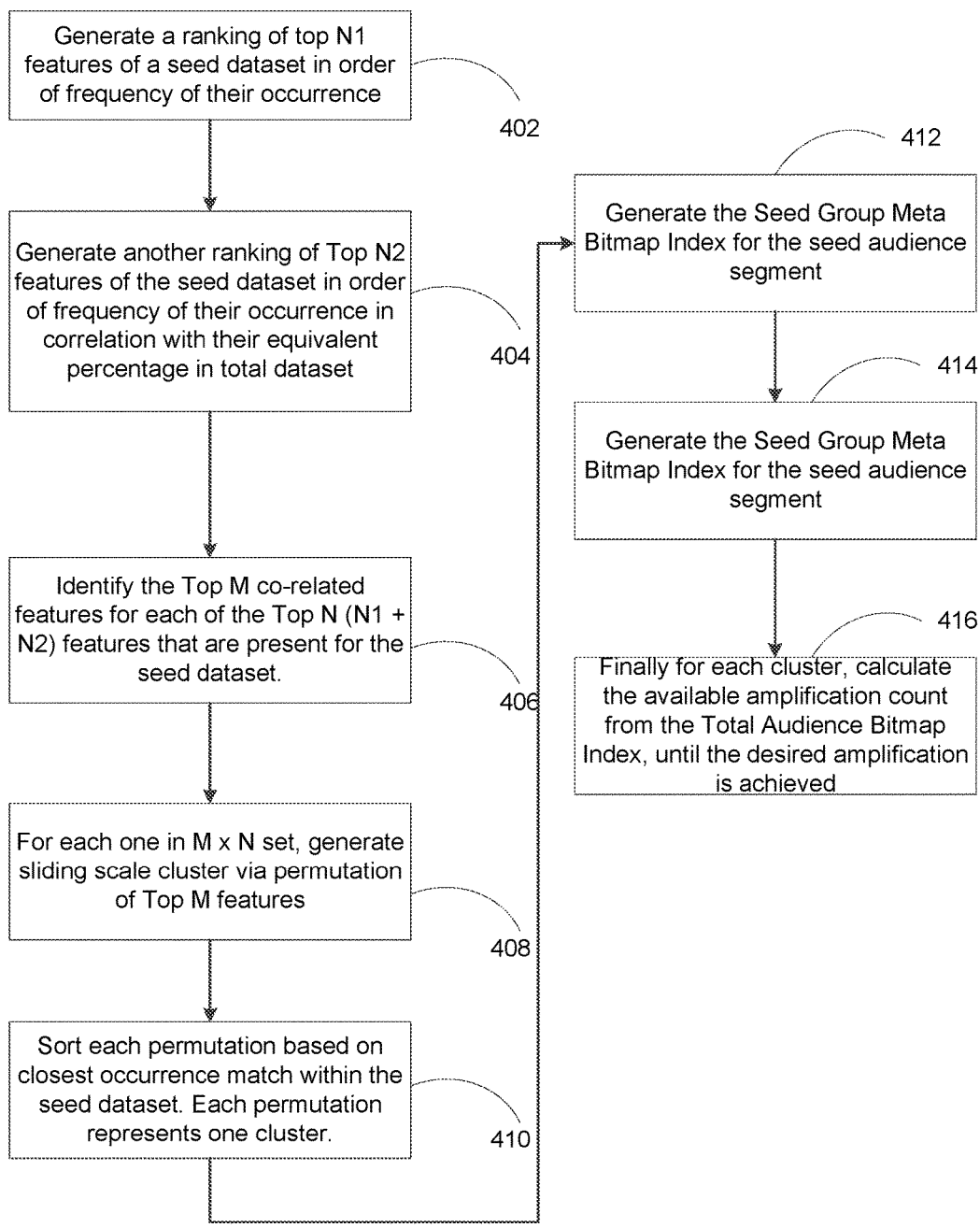
FIG. 4 illustrates a flow chart of an exemplary method according to one embodiment of the invention.
Figure 8:
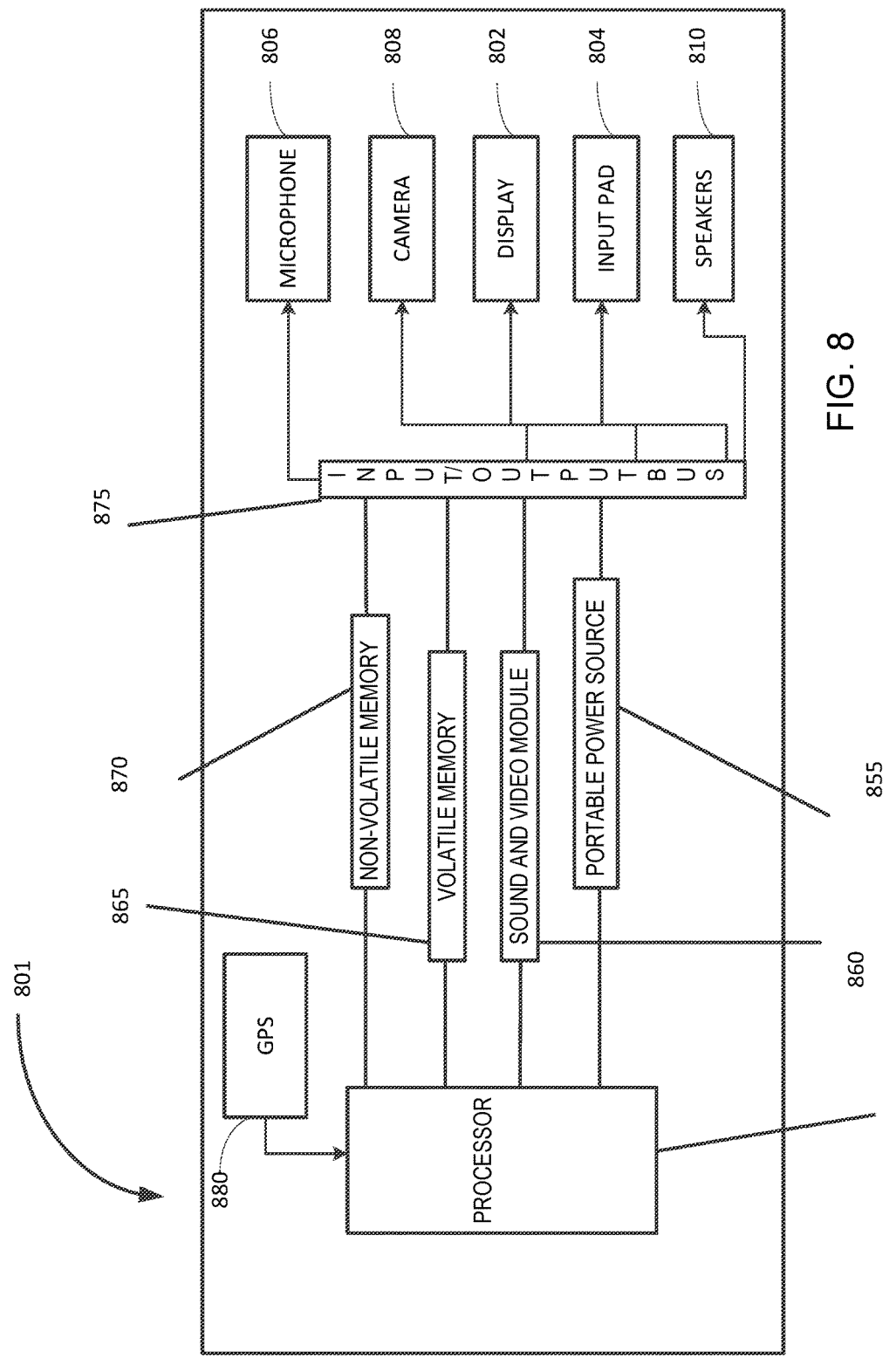
FIG. 8 is an illustration of a portable computing device suitable for aspects of the invention.

In one embodiment, in order to generate the desired magnification of data within a population, a computerized system such as those shown in FIGS. 8 and 9 may be used. The computerized system may execute exemplary computer-executable instructions as illustrated in FIG. 4. At 402, the method may generate a first ranking of a first set of top features, such as top N1 features, of a seed dataset in order of frequency of their occurrence. At 404, the computer-executable instructions may generate a second or another ranking of a second set of top features, such as top N2 features, of the seed dataset in order of frequency of their occurrence in correlation with their equivalent percentage in total dataset. At 406, the method may further identify a set of co-related, such as Top M co-related, features for each of the Top N (N1+N2) features that are present for the seed dataset.

At 408, for each one in M×N set, generate sliding scale cluster via permutation of Top M features. In one example, at 410, the computer-executable instructions include sorting each permutation based on closest occurrence match within the seed dataset. Each permutation represents one cluster. At 412, generate the Seed Group Meta Bitmap Index for the seed audience segment. In one example, the method may use this index compute the intersection counts across each cluster. In one example, at 414, the system such as FIG. 8 or FIG. 9 may execute computer-executable instructions to generate a total audience bitmap index. At 416, finally for each cluster, calculate the available amplification count from the Total Audience Bitmap Index, until the desired amplification is achieved.

Embodiments of the invention may also reflect in algorithms that discover multiple cluster groups, with accurate intersection points for each cluster, irrespective of whether those clusters embed into each other or the cluster groups overlap with each other. As such, embodiments may generate sliding scale cluster groups and calculate accurate intersection points across overlapping groups and embedding cluster makes it possible to do precise look-alike modeling.

Figure 5:
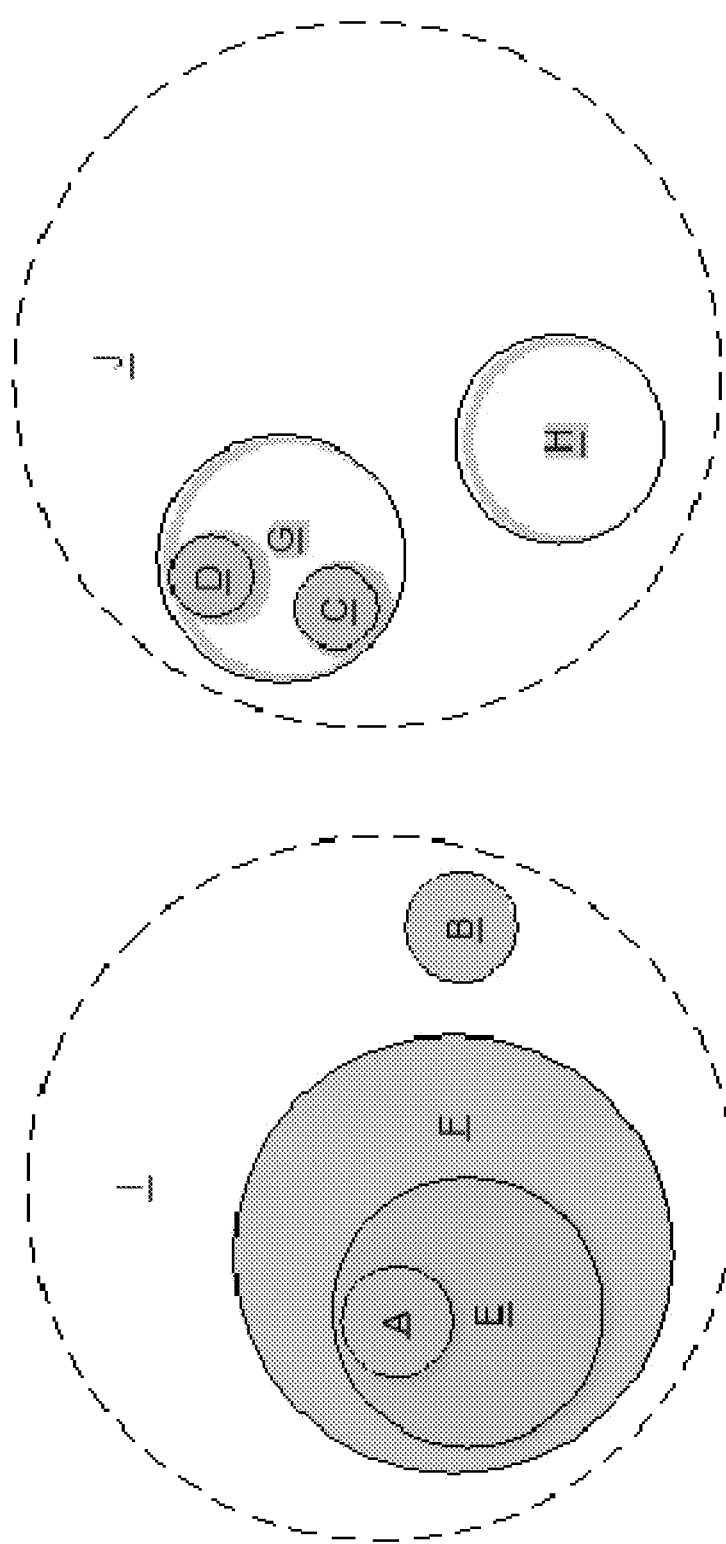
FIG. 5 illustrates a diagram of a sliding scale cluster groups subset according to one embodiment of the invention.

To further understand sliding scale cluster logic, the following tables further illustrate embodiments of the invention with subset of clusters in conjunction with FIG. 5:

For example, suppose there are 20 features (such as parameters or attributes) per audience, and each cluster group is created using 5 features each.

Cluster Group 1 is discovered using features F1, F2, F4, F6, F8

Cluster Group 2 is discovered using features F2, F3, F4, F5, F7

Tables below show the features per cluster group:

| Sort Order | Cluster | Sliding | F1 | F2 | F4 | F6 | F8 | Count | Precise Count |
|---|---|---|---|---|---|---|---|---|---|
| 1 | A | N | 1 | 1 | 1 | 1 | 0 | 1600 | 1600 |
| 3 | E | N | 1 | 1 | 1 | 0 | 0 | 3500 | 1700 |
| 5 | B | N | 1 | 0 | 0 | 0 | 1 | 4000 | 3600 |
| 6 | F | Y | 1 | 1 | 0 | 0 | 0 | 6000 | 2500 |
| 9 | I | Y | 1 | 0 | 0 | 0 | 0 | 15000 | 4000 |

| Sort Order | Cluster | Sliding | F2 | F3 | F4 | F5 | F7 | Count | Precise Count |
|---|---|---|---|---|---|---|---|---|---|
| 2 | C | N | 1 | 0 | 1 | 1 | 0 | 1400 | 1200 |
| 4 | D | N | 1 | 0 | 1 | 0 | 1 | 1000 | 900 |
| 7 | G | N | 1 | 0 | 1 | 0 | 0 | 5500 | 2800 |
| 8 | H | N | 1 | 1 | 0 | 0 | 0 | 4500 | 4300 |
| 10 | J | Y | 1 | 0 | 0 | 0 | 0 | 12000 | 6200 |

Using the above precise counts calculated per cluster and using the Seed Group Meta bitmap index, proportional amplification is made from total population by using the Total Audience Bitmap Index to ensure unique audience are selected for each cluster amplification, thereby ensuring same person is not counted twice if that person appears in more than one cluster.

Figure 6:
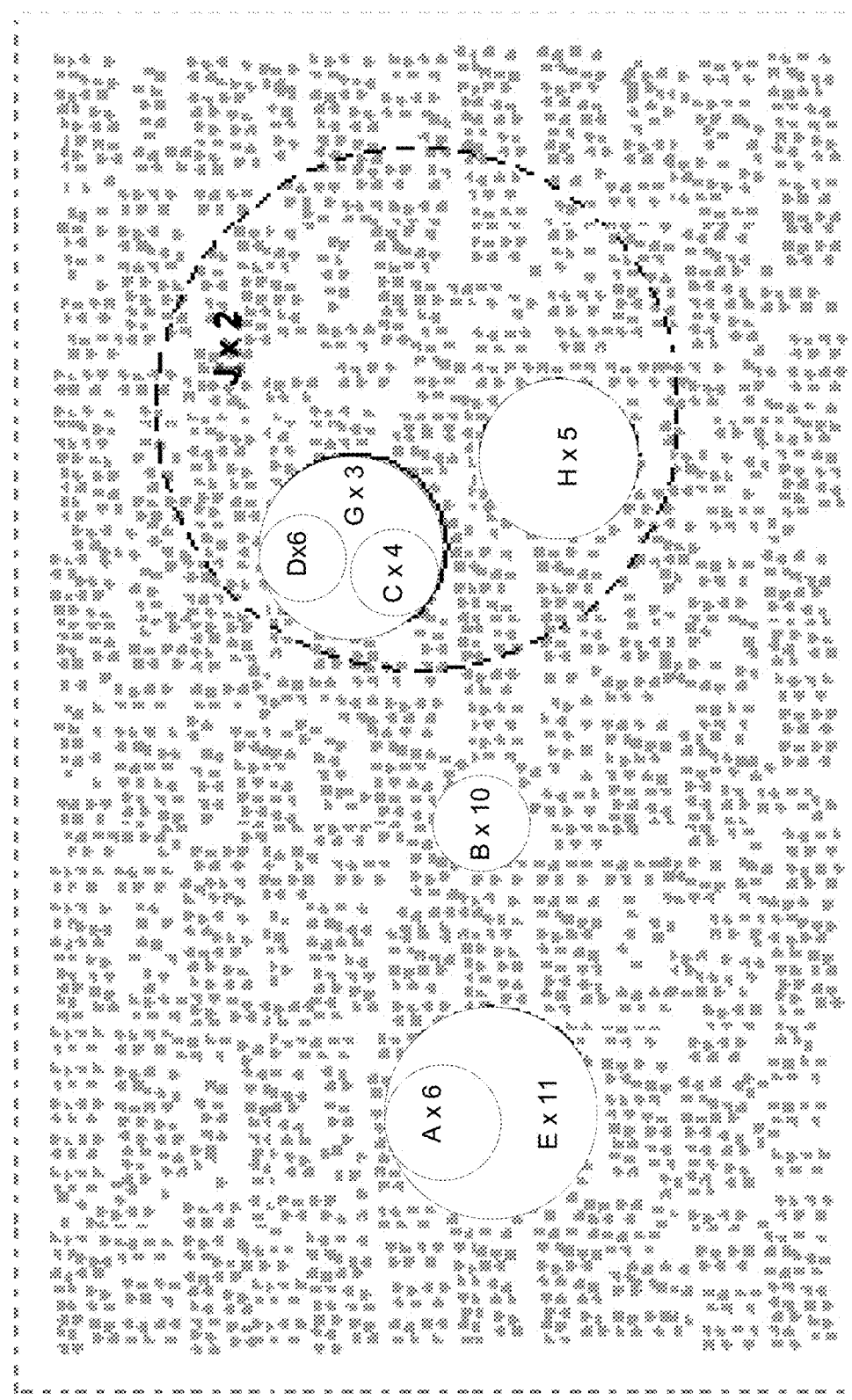
FIG. 6 illustrates a diagram showing the clusters based on FIG. 5 that are found against the total population after the proportional amplification is done according to one embodiment of the invention.

FIG. 6 illustrates a diagram showing the clusters based on FIG. 5 that are found against the total population after the proportional amplification is done.

In FIG. 6, for example, the clusters F and I are not needed as the total population had enough matching persons required for amplification of clusters A, E, & B. Hence there is no need to further apply sliding scale to include cluster F & I, for achieving the proportional count for this cluster group.

In a further embodiment, aspects of the invention may further be extended to provide high-level of customization for advanced use cases by implementing functionality to allow users to calibrate rank for each feature set using following:

Weight for each feature (By default all features have same weight)

Co-relation across features (By default no features are co-related)

Mutual exclusion across features (By default set to None)

Additionally, the algorithm according to embodiments of the invention may be recursively applied for each cluster to fine tune the final amplification to as closest match to the seed audience as possible, resulting in very precise lookalike modeling that cannot be attained by other algorithms currently used in this space.

Figure 7A:
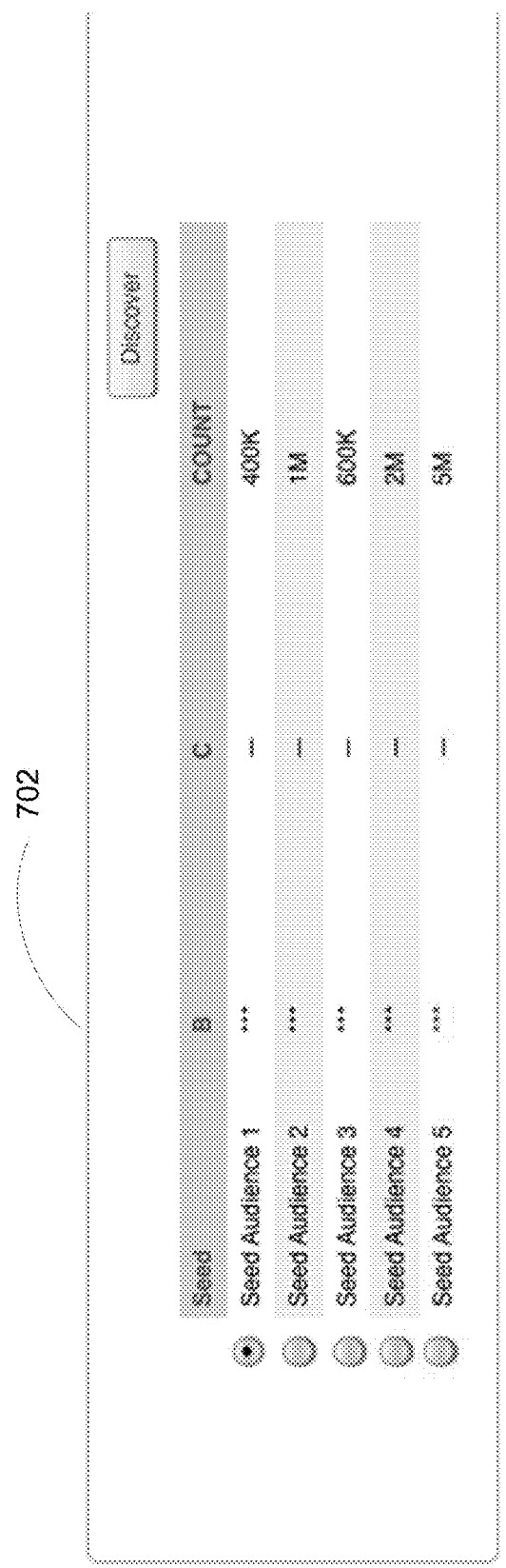
FIGS. 7A and 7B illustrate graphical user interface (GUI) for dynamically modifying or customizing cluster sizes according to one embodiment of the invention.
Figure 7B:
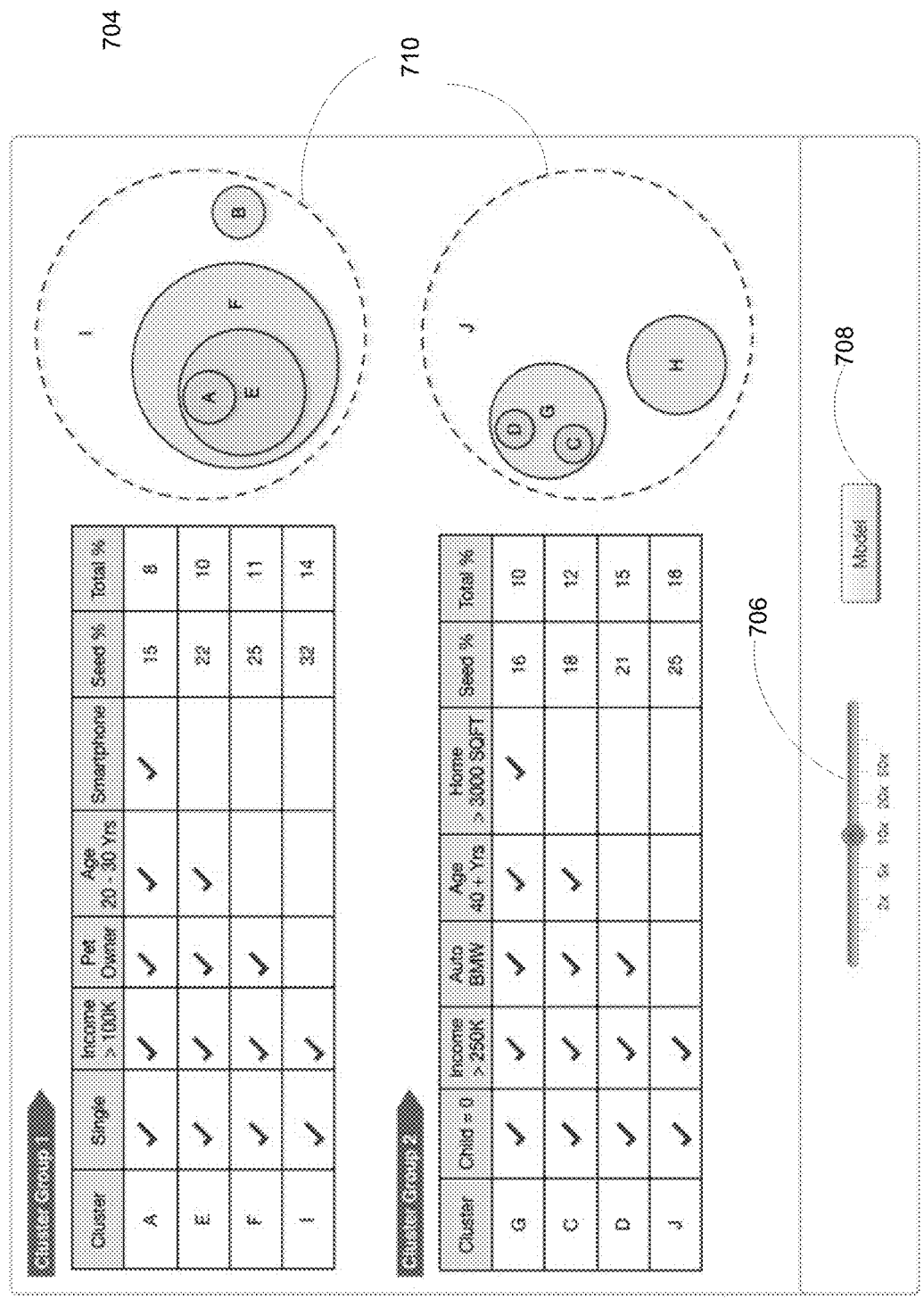

FIGS. 7A and 7B illustrate graphical user interface (GUI) for dynamically modifying or customizing cluster sizes according to one embodiment of the invention. For example, FIG. 7A shows a GUI 702 having a number of controls for displaying different seed sizes based on the user's requirements or requests. In FIG. 7B, a GUI 704 illustrate a similar information as those in FIG. 5 with the corresponding tables next thereto. However, the sliding scale bar 706 is conveniently displayed at the bottom of the GUI 704 to enable the user to quickly and dynamically change the magnification to achieve the result of FIG. 6 as appropriate. The button 708 may also be used to confirm the desirable modeling scale. As the user toggles a graphical element 706 (with a corresponding text element beneath it) showing a set of available amplifications to different magnification, the diagram areas (or a second graphical display areas) 710 may correspondingly adjust the display of contents and underlying data filtering according to the graphical element 706.

Moreover, while throughout the figures, such as FIGS. 2, 3, 5, 6, and 7A-7B, circles are shown as an exemplary implementation to show the different cluster groups, it is to be understood that other shapes may be used for showing the different cluster sizes. In addition, it is also to be understood that, in addition to shapes, different colors or line styles may be used to show the different cluster's labels or representation without departing from the scope or spirit of embodiments of the invention.

FIG. 8 illustrates a simple diagram illustrating a high level of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The claimed system and method may address several technical problems and challenges, some of which are described. Currently, entering potential sensitive data across networks makes users nervous to the point that a sale may be lost or money or time saving tips or coupons may not be received. By using a proprietary network such as a payment network, to transfer potentially sensitive data, security may be higher and users may be more open to joining additional beneficial programs. Similarly, moving data from one payment system to another loyalty system has felt risky to some users, but by using a proprietary, trusted network, the data may be communicated in a more trustworthy fashion. In addition, formatting data and communicating data in a manner which may be understood by a variety of additional programs is a technical challenge or problem which the system and method has addressed.

The user devices, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

In one embodiment, the remote computing device 841 and the portable computing device 801 may execute the exemplary method shown in FIG. 4.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving user graphical interface (GUI) associated with editing, composing, validating, or submitting API requests as described above. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

What is claimed is:

1. A computerized method for generating dynamic lookalike data points of a seed dataset on a graphical user interface (GUI) comprising:
   defining a seed dataset from a collection of data, said collection of data comprising features associated with data;
   generating a first ranking of a first set of top features of the seed dataset;
   generating a second ranking of a second set of top features of the seed dataset;
   identifying an M×N set which is an M set of correlated features for each of a combined set N from the first set and the second set that are present in the seed dataset;
   for each one in the M×N set, generating a sliding scale cluster, in response to a user adjustment of a sliding scale slider displayed on the GUI while absent adjustments to the first set, the second set, the M set, the N set, and the M×N set, via permutation of the M sets of correlated features to be displayed on the GUI;
   generating a seed group meta bitmap index for a seed audience segment;
   generating a total audience bitmap index based on the generated seed group meta bitmap index; and
   for each sliding scale cluster, generating an available amplification count from the total audience bitmap index for display on the GUI in response to the user adjustment on the sliding scale slider while absent adjustments to the seed group meta bitmap index, and the total audience bitmap index, received from the GUI until a desired amplification count in the available amplification count is achieved.

2. The computerized method of claim 1, wherein generating the ranking of the first set of top features of the seed dataset is based on an order of frequency of their occurrences.

3. The computerized method of claim 1, wherein generating the ranking of the second set of top features of the seed dataset is based on an order of frequency of their occurrence in correlation with their equivalent percentage in the entire collection of data.

4. The computerized method of claim 1, wherein generating the sliding scale cluster comprises sorting each permutation based on a closest occurrence match within the seed dataset.

5. The computerized method of claim 1, further comprising displaying on the GUI each permutation as one cluster of data.

6. The computerized method of claim 1, further comprising identifying intersection counts across each cluster based on the seed map meta bitmap index to be displayed on the GUI.

7. The computerized method of claim 1, further comprising displaying each of the clusters with different colors or different shading of colors.

8. A computerized system for generating dynamic lookalike data points of seed dataset on a graphical user interface (GUI) comprising:
   a database system for storing a collection of data, said collection of data comprising features associated with data;
   wherein the database system defines a seed dataset from a collection of data in response to a user instruction;
   a processor configured to execute computer-executable instructions to generate a first ranking of a first set of top features of the seed dataset;
   wherein the processor generates a second ranking of a second set of top features of the seed dataset;
   wherein the processor identifies an M×N set which is an M set of correlated features for each of a combined set N from the first set and the second set that are present in the seed dataset;
   for each one in the M×N set, wherein the processor generates a sliding scale cluster, in response to a user adjustment of a sliding scale slider displayed on the GUI while absent adjustments to the first set, the second set, the M set, the N set, and the M×N set, via permutation of the M set of correlated features to be displayed on the GUI;
   wherein the processor generates a seed group meta bitmap index for a seed audience segment;
   wherein the processor generates a total audience bitmap index based on the generated seed group meta bitmap index;

for each cluster, wherein the processor generates an available amplification count from the total audience bitmap index; and a display for displaying the available amplification count on the GUI, in response to the user adjustment on the sliding scale slider while absent adjustments to the seed group meta bitmap index, and the total audience bitmap index, received from the GUI, until a desired amplification count in the available amplification count is achieved.

9. The computerized system of claim 8, wherein the processor generates the first ranking of the first set of top features of the seed dataset based on an order of frequency of their occurrences.

10. The computerized system of claim 8, wherein the processor generates the second ranking of the second set of top features of the seed dataset based on an order of frequency of their occurrence in correlation with their equivalent percentage in entire collection of data.

11. The computerized system of claim 8,
wherein generating the sliding scale comprises sorting each permutation based on a closest occurrence match within the seed dataset.

12. The computerized system of claim 8, wherein the display displays on the GUI each permutation as one cluster of data.

13. The computerized system of claim 8, wherein the processor identifies intersection counts across each cluster based on the seed map meta bitmap index to be displayed on the GUI.

14. The computerized system of claim 8, wherein the display displays each of the clusters with different colors or different shading of colors.

15. A computerized system for generating dynamic look-alike data points of a seed dataset on a graphical user interface (GUI) comprising:

a database system for storing a collection of data, said collection of data comprising features associated with data;

wherein the database system defines a seed dataset from a collection of data in response to a user instruction;

a processor configured to execute computer-executable instructions to generate a first ranking of a first set of top features of the seed dataset;

wherein the processor generates a second ranking of a second set of top features of the seed dataset;

wherein the processor identifies an M×N set which is an M set of correlated features for each of a combined set N from the first set and the second set that are present in the seed dataset;

for each one in the M×N set, wherein the processor generates a sliding scale cluster, in response to a user adjustment of a sliding scale slider displayed on the GUI while absent adjustments to the first set, the second set, the M set, the N set, and the M×N set, via permutation of the M set of correlated features to be displayed on the GUI, wherein the GUI defines a first data field for displaying data values for the sliding scale cluster and wherein the GUI defines a second graphical display area for graphically representing the sliding scale cluster;

wherein the processor generates a seed group meta bitmap index for a seed audience segment;

wherein the processor generates a total audience bitmap index based on the generated seed group meta bitmap index;

for each cluster, wherein the processor generates an available amplification count from the total audience bitmap index; and a display for displaying the available amplification count on the GUI, in response to the user adjustment on the sliding scale slider while absent adjustments to the seed group meta bitmap index, and the total audience bitmap index, received from the GUI, until a desired amplification count in the available amplification count is achieved, wherein the display defines a graphical element and a corresponding text element of the available amplification count on the GUI.

16. The computerized system of claim 15, wherein the processor generates the first ranking of the first set of top features of the seed dataset based on an order of frequency of their occurrences.

17. The computerized system of claim 15, wherein the processor generates the second ranking of the second set of top features of the seed dataset based on an order of frequency of their occurrence in correlation with their equivalent percentage in entire collection of data.

18. The computerized system of claim 15,
wherein generating the sliding scale comprises sorting each permutation based on a closest occurrence match within the seed dataset.

19. The computerized system of claim 15, wherein the display displays on the GUI each permutation as one cluster of data.

20. The computerized system of claim 15, wherein the processor identifies intersection counts across each cluster based on the seed map meta bitmap index to be displayed on the GUI.

* * * * *